(12) United States Patent
Mihara

(10) Patent No.: US 7,519,868 B2
(45) Date of Patent: Apr. 14, 2009

(54) INFORMATION PROCESSING APPARATUS, INFORMATION PROCESSING METHOD, COMPUTER PROGRAM, AND STORAGE MEDIUM

(75) Inventor: Makoto Mihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 468 days.

(21) Appl. No.: 11/298,842

(22) Filed: Dec. 9, 2005

(65) Prior Publication Data

US 2006/0150017 A1      Jul. 6, 2006

(30) Foreign Application Priority Data

Dec. 16, 2004   (JP) ............................... 2004-364781

(51) Int. Cl.
*G06F 11/00*   (2006.01)

(52) U.S. Cl. ........................................................ 714/38

(58) Field of Classification Search .................... 714/38
See application file for complete search history.

(56) References Cited

U.S. PATENT DOCUMENTS 5,951,653 A *  9/1999  Hill et al. ..................... 719/315

| | | | |
|---|---|---|---|
| 6,892,326 B2 * | 5/2005 | Ma et al. | 714/38 |
| 6,996,808 B1 * | 2/2006 | Niewiadomski et al. | 717/130 |
| 7,188,279 B2 * | 3/2007 | Iizuka | 714/38 |
| 7,240,244 B2 * | 7/2007 | Teegan et al. | 714/38 |
| 7,353,501 B2 * | 4/2008 | Tang et al. | 717/130 |
| 2004/0003326 A1 * | 1/2004 | Lizuka | 714/45 |
| 2004/0225923 A1 * | 11/2004 | Teegan et al. | 714/38 |
| 2005/0114738 A1 * | 5/2005 | Ma et al. | 714/38 |

FOREIGN PATENT DOCUMENTS

JP        2004-038311        2/2004

* cited by examiner

*Primary Examiner*—Robert Beausoliel
*Assistant Examiner*—Charles Ehne
(74) *Attorney, Agent, or Firm*—Cowan, Liebowitz & Latman, P.C.

(57) ABSTRACT

In an information processing apparatus which executes a first module, a second module, and a third module for mediating a call from the first module to a function in the second module and obtaining the log of processing in the second module, the third module determines operation condition of the initialization processing when a call from the first module to a function associated with initialization processing in the second module is detected, executes the function associated with the initialization processing in the determined operation condition, and notifies the first module of the execution result.

5 Claims, 11 Drawing Sheets

FIG. 7

| | | | |
|---|---|---|---|
| EXE | Interface A' VTable | Method A'A Address | 145 |
| | | Method A'B Address | 146 |
| | | Method A'C Address | 147 |
| | Interface B' VTable | Method B'A Address | 148 |
| | | Method B'B Address | 149 |
| | | Method B'C Address | 150 |
| COM Server | Interface A | Method AA Code | 151 |
| | | Method AB Code | 152 |
| | | Method AC Code | 153 |
| | Interface B | Method BA Code | 154 |
| | | Method BB Code | 155 |
| | | Method BC Code | 156 |
| DLL | Interface A' | Method A'A Code (Call Method AA) | 157 |
| | | Method A'B Code (Call Method AB) | 158 |
| | | Method A'C Code (Call Method AC) | 159 |
| | Interface B' | Method B'A Code (Call Method BA) | 160 |
| | | Method B'B Code (Call Method BB) | 161 |
| | | Method B'C Code (Call Method BC) | 162 |

Left-side brackets: 136, 137, 138 (EXE); 139, 140, 141 (COM Server); 142, 143, 144 (DLL)

INFORMATION PROCESSING APPARATUS, INFORMATION PROCESSING METHOD, COMPUTER PROGRAM, AND STORAGE MEDIUM

FIELD OF THE INVENTION

The present invention relates to an information processing apparatus, information processing method, computer program, and storage medium.

BACKGROUND OF THE INVENTION

A software failure at a low recall ratio is often dealt with by obtaining a software processing log. The processing log is conventionally obtained by correcting an application software module and adding a processing log obtaining routine. The method which requires correction of application software such as embedding of a log obtaining code complicates a correction process.

Against this background, there is proposed a method capable of obtaining a processing log by providing a log obtaining module without performing any complicated correction of application software itself (see Japanese Patent Application Laid-open No. 2004-38311). In software divided into a plurality of modules, the log obtaining module mediates a call for a function present in a given module from a module corresponding to application software, and obtains a processing log in the given module which responds to the call.

Log obtaining software for obtaining the log of processing in a predetermined application (application whose log is to be obtained) requires initialization processing in order to analyze an information setting file for defining function information of the application. Initialization processing corresponds to either an STA (Single Thread Apartment) or MTA (Multi Thread Apartment) operation condition.

When the application whose log is to be obtained is to perform initialization processing according to initialization processing by the log obtaining software, initialization processing by the application may fail because initialization processing by the log obtaining software has already been done. In order to prevent any failure in initialization processing, it must be set in the log obtaining software which of the STA and MTA operation conditions corresponds to initialization processing performed by the application. In addition, the log obtaining software must execute initialization processing identical to setting contents.

In order to provide the log obtaining software with settings of initialization processing performed by the application whose log is to be obtained, a user who tries to obtain the log must know the internal structure of the application. However, setting processing which requires preliminary knowledge is complicated for the user, and not all users have sufficient knowledge on the internal structure of the application. It is, therefore, difficult to reliably prevent a failure in initialization processing.

SUMMARY OF THE INVENTION

It is an object of the present invention to allow detect the type of initialization processing of an application whose log is to be obtained log obtaining software and perform initialization of log obtaining software corresponding to the detected initialization processing.

According to one aspect of embodiments of the present invention, an information processing apparatus which executes a first module, a second module, and a third module for mediating a call from the first module to a function in the second module and obtaining a log of processing in the second module is provided. The third module comprising a detector which detects a call from the first module to a function associated with initialization processing in the second module, a determination unit which determines the operation condition of the initialization processing when the call is detected, an execution unit which executes the function associated with the initialization processing in the determined operation condition, and a notifying unit which notifies the first module of an execution result of the function associated with the initialization processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing the memory configuration of the information processing apparatus according to the embodiment of the present invention;

DETAILED DESCRIPTION OF THE PREFERRED EMBODIMENTS

Preferred embodiments of the present invention will now be described in detail in accordance with the accompanying drawings.

Figure 1:
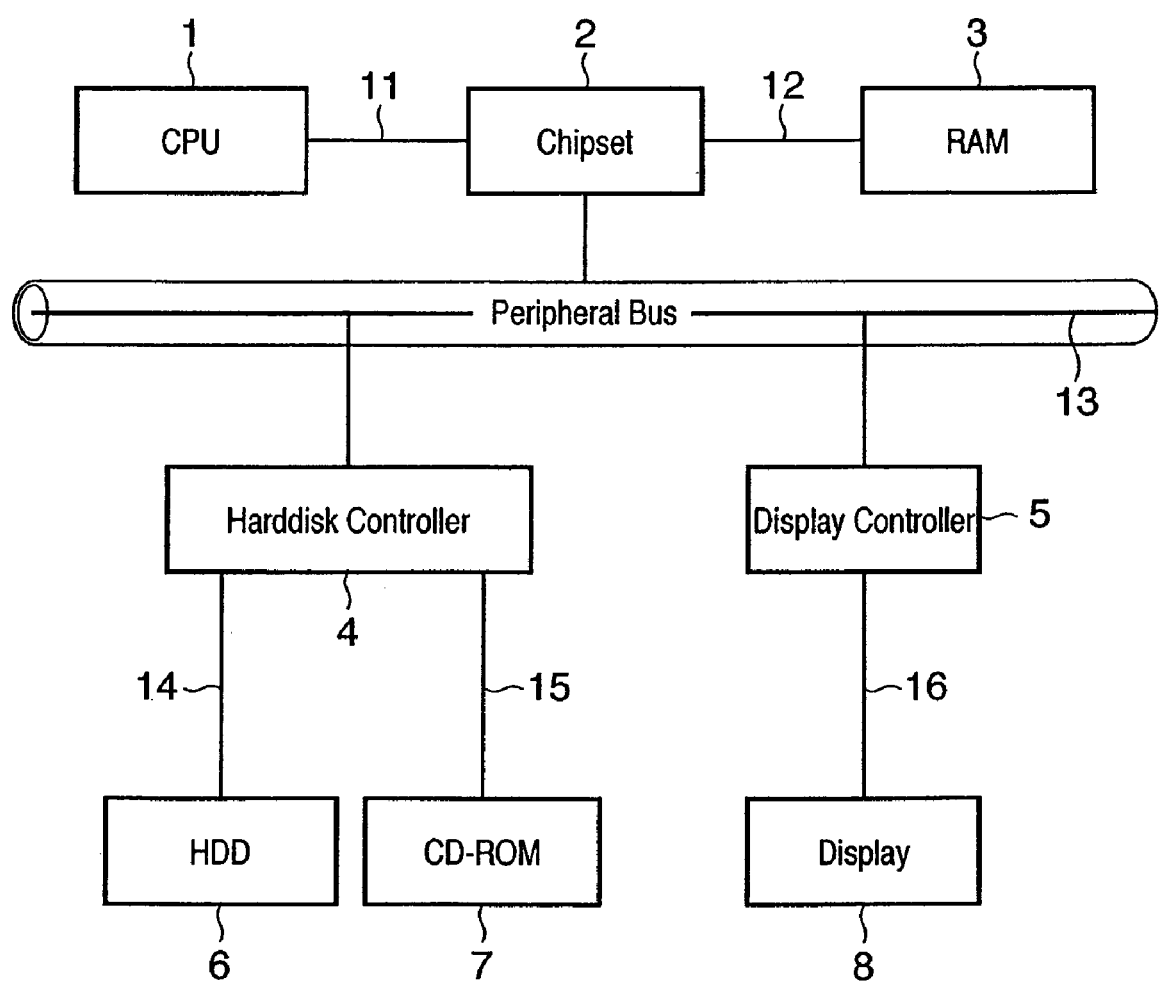
FIG. 1 is a block diagram showing an example of the configuration of an information processing apparatus according to an embodiment of the present invention.

FIG. 1 is a block diagram showing an example of the configuration of an information processing apparatus according to an embodiment. For descriptive convenience, the information processing system is constructed in one PC in the embodiment. However, characteristic features of the present invention are effective regardless of whether the information processing system is constructed in one PC or in a plurality of PCs as a network system.

The information processing apparatus comprises a CPU 1, chipset 2, RAM 3, harddisk controller 4, display controller 5, harddisk drive 6, CD-ROM drive 7, and display 8. The information processing apparatus incorporates a signal line 11 which connects the CPU 1 and chipset 2, a signal line 12 which connects the chipset 2 and RAM 3, a peripheral bus 13 which connects the chipset 2 and various types of peripheral devices 4 and 5, a signal line 14 which connects the harddisk controller 4 and harddisk drive 6, a signal line 15 which connects the harddisk controller 4 and CD-ROM drive 7, and a signal line 16 which connects the display controller 5 and display 8.

Figure 2:
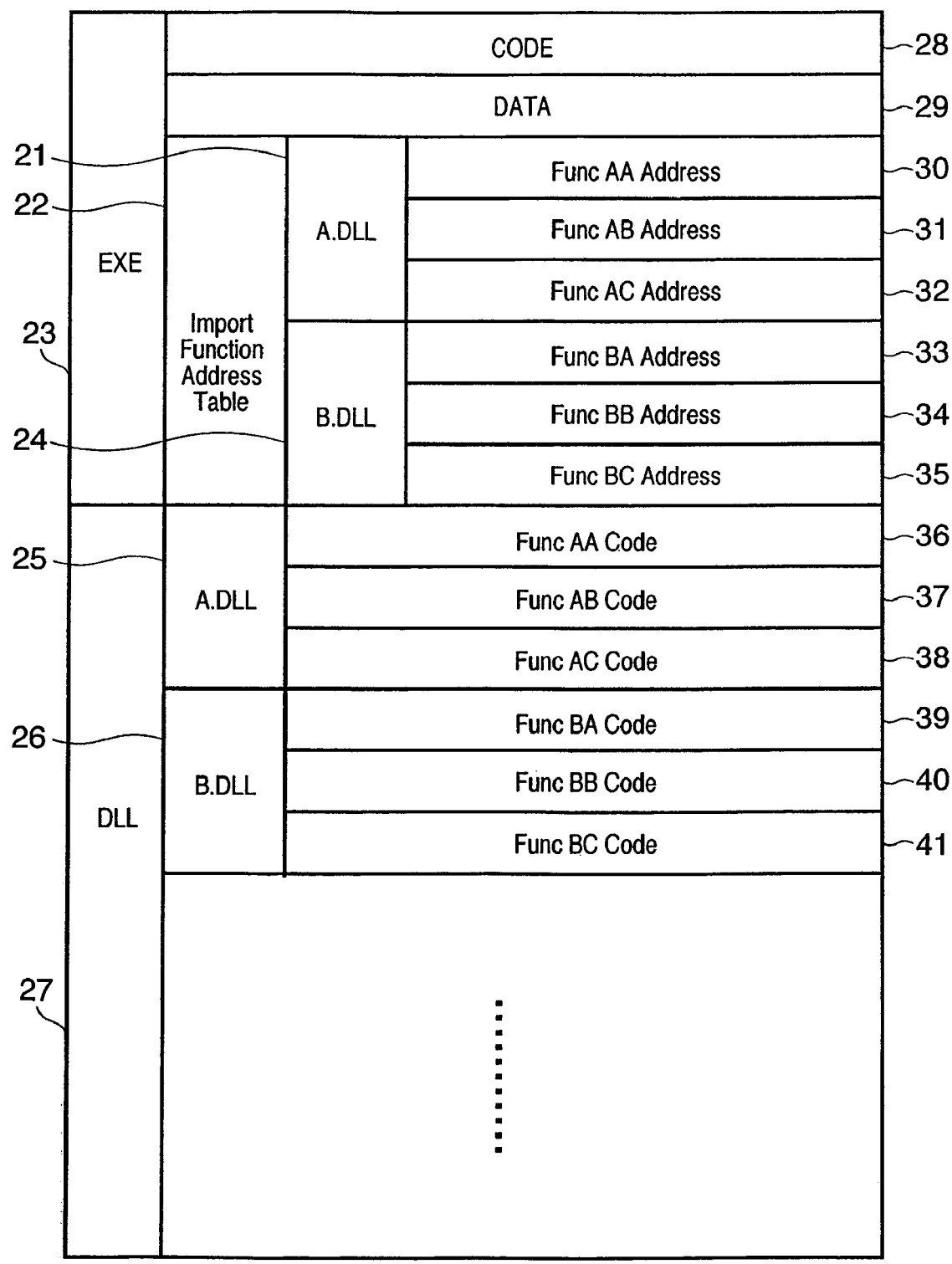
FIG. 2 is a view for explaining a case wherein software divided into a plurality of modules is loaded into the memory of the information processing apparatus according to the embodiment of the present invention.

To explain the information processing apparatus according to the embodiment, how to load, into a memory in a normal state, software which is divided into a plurality of modules will be explained with reference to FIG. 2. FIG. 2 is a view showing an example of the internal configuration of the RAM.

In general, software divided into a plurality of modules exists separately as an executable file EXE (23) which controls the overall operation, and a dynamic link library DLL (27) which exists as a module and plays a complementary role of EXE. Both EXE and DLL are loaded into the RAM 3. EXE is made up of a code segment (28), data segment (29), and import function address table (22). The import function address table is subdivided into DLLs (21 and 24) to which functions belong. Each DLL holds an address at which each function is loaded (30 to 35).

The entities of the functions in the DLLs are loaded for the respective DLLs (25 and 26), and the functions are loaded as parts of corresponding DLLs (36 to 41). In FIG. 2, one EXE uses functions in two dynamic link libraries for A.DLL and B.DLL. Functions used actually are six functions: Func AA, Func AB, Func AC, Func BA, Func BB, and Func BC.

When a code in the code segment 28 of EXE calls the function Func AA, a Func AA address (30) that is written in the import function address table is read. In practice, the address of a Func AA code (36) which is read as part of A.DLL is written. By calling the address, the EXE code can call Func AA of A.DLL.

An example of the memory configuration of the information processing apparatus when a function call is mediated using IAT Patch (Import Address Table Patch) as a log obtaining code will be explained with reference to FIG. 3.

After the start of obtaining a log, C.DLL (58) serving as an IAT Patch DLL is loaded into the memory. C.DLL rewrites the addresses of functions written in an import function address table (52) into those (61 to 66) of log obtaining codes Func CAA, Func CAB, Func CAC, Func CBA, Func CBB, and Func CBC in C.DLL. The codes (73 to 78) of Func CAA, Func CAB, Func CAC, Func CBA, Func CBB, and Func CBC in C.DLL record logs, and call corresponding functions Func AA, Func AB, Func AC, Func BA, Func BB, and Func BC (67 to 72) which have been loaded in the memory and wait for function calls.

Figure 3:
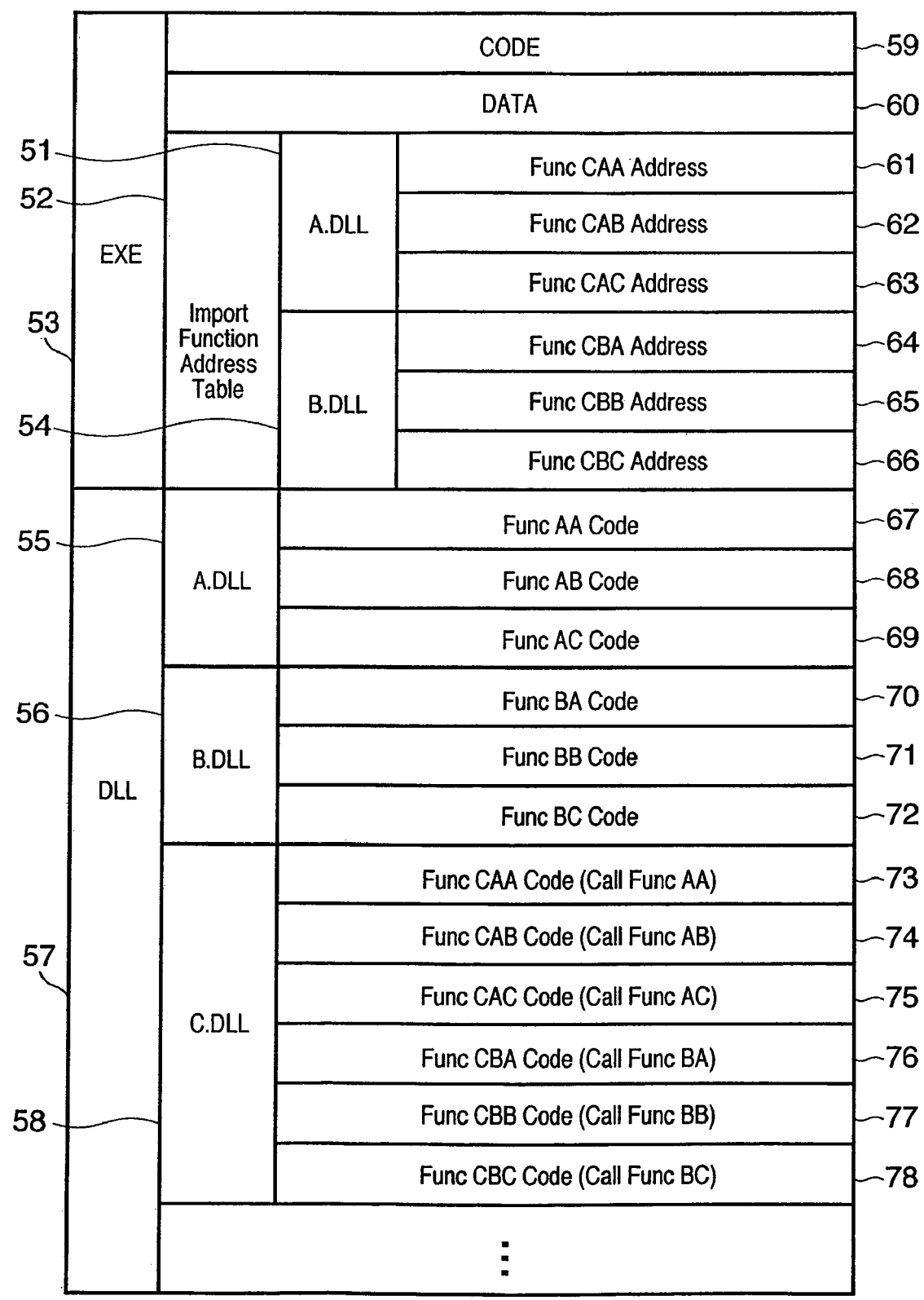
FIG. 3 is a view showing an example of the memory configuration of the information processing apparatus when a function call is mediated using IAT Patch as a log obtaining code according to the embodiment of the present invention.
Figure 4:
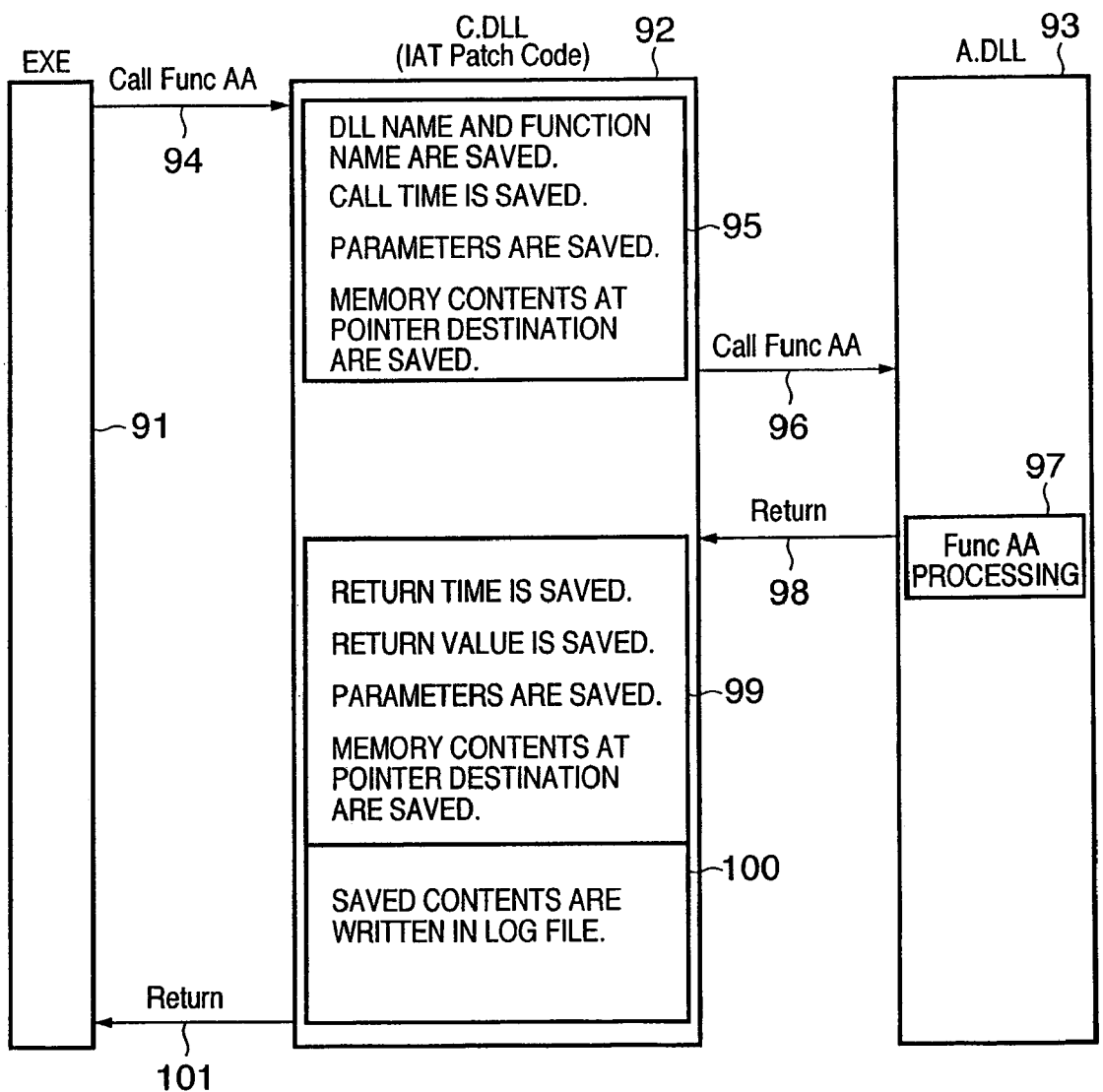
FIG. 4 is a timing chart showing an example when IAT Patch processing is executed in the information processing apparatus according to the embodiment of the present invention.

FIG. 4 is a timing chart showing IAT Patch processing in FIG. 3. For descriptive convenience, FIG. 4 shows an example of how the log obtaining code based on IAT Patch operates when EXE calls Func AA in A.DLL. The same processing is also performed for another function.

When EXE (91) calls Func AA (94), a log obtaining code in C.DLL saves a DLL name and function name in the memory, saves the call time in the memory, saves parameters upon the call in the memory, and saves memory contents represented by pointer parameters upon the call in the memory (95). After that, C.DLL calls Func AA in A.DLL (93) that is supposed to be called (96). Func AA processing (97) in A.DLL ends, and control returns to C.DLL (98). C.DLL saves the return time in the memory, saves the return value in the memory, and saves memory contents represented by pointer parameters upon return in the memory (99). C.DLL writes the saved log information in a file (100), and control returns to EXE as if Func AA of A.DLL normally ended (101).

Figure 5:
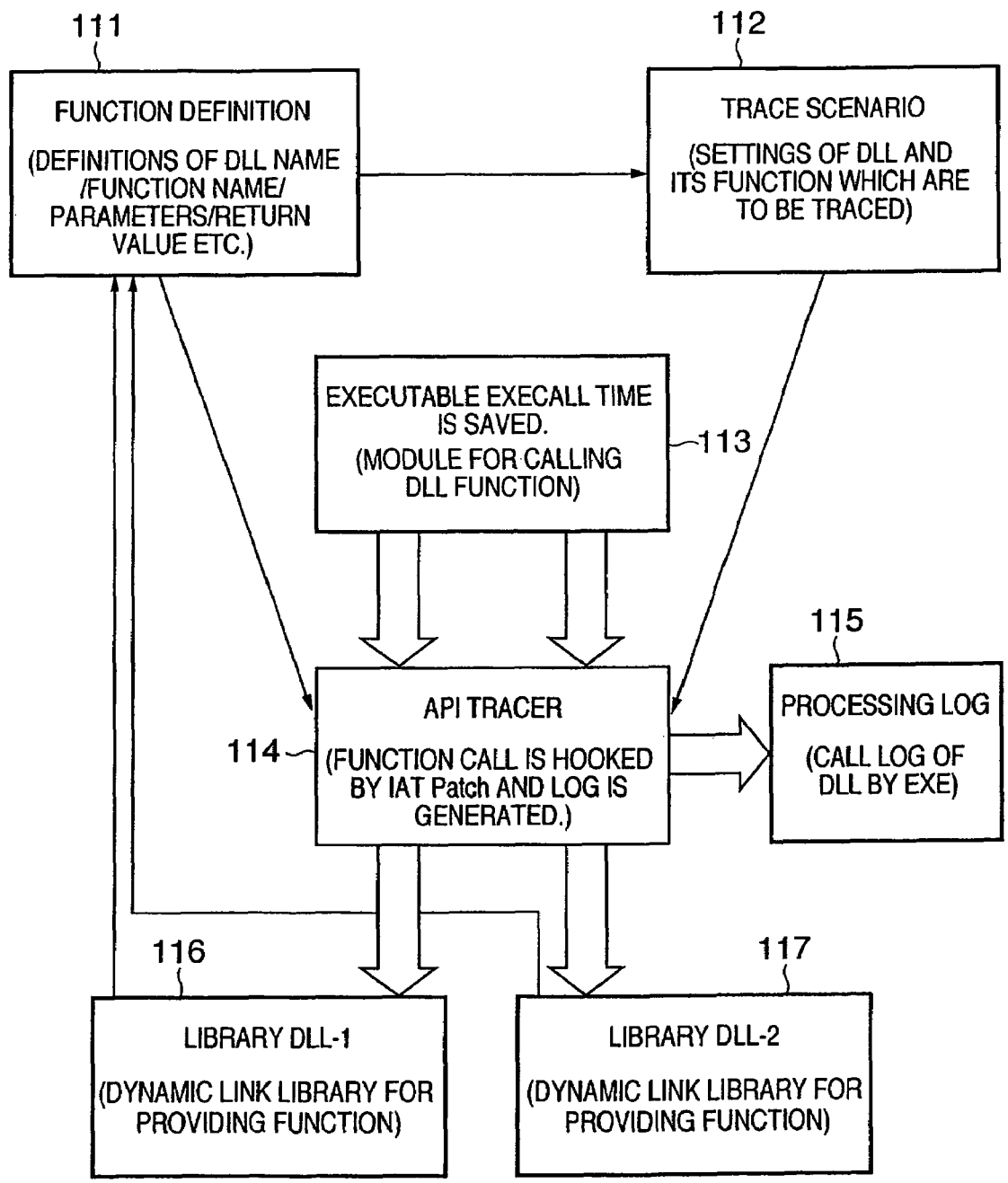
FIG. 5 is a view showing an example of operation when an executable file EXE is executed in the information processing apparatus according to the embodiment of the present invention.

FIG. 5 is a view showing an example of operation when the executable file EXE is executed in the information processing apparatus according to the embodiment. In general, an executable EXE (113) calls functions in DLL-1 (116) and DLL-2 (117). In FIG. 5, a log obtaining code called an API tracer is embedded (114) to generate a processing log (115). The API tracer operates on the basis of a file (111) which describes the function definitions of DLL-1 and DLL-2, and a setup scenario (112) representing a DLL and a function in the DLL for which an import function table is rewritten to obtain a log.

Figure 6:
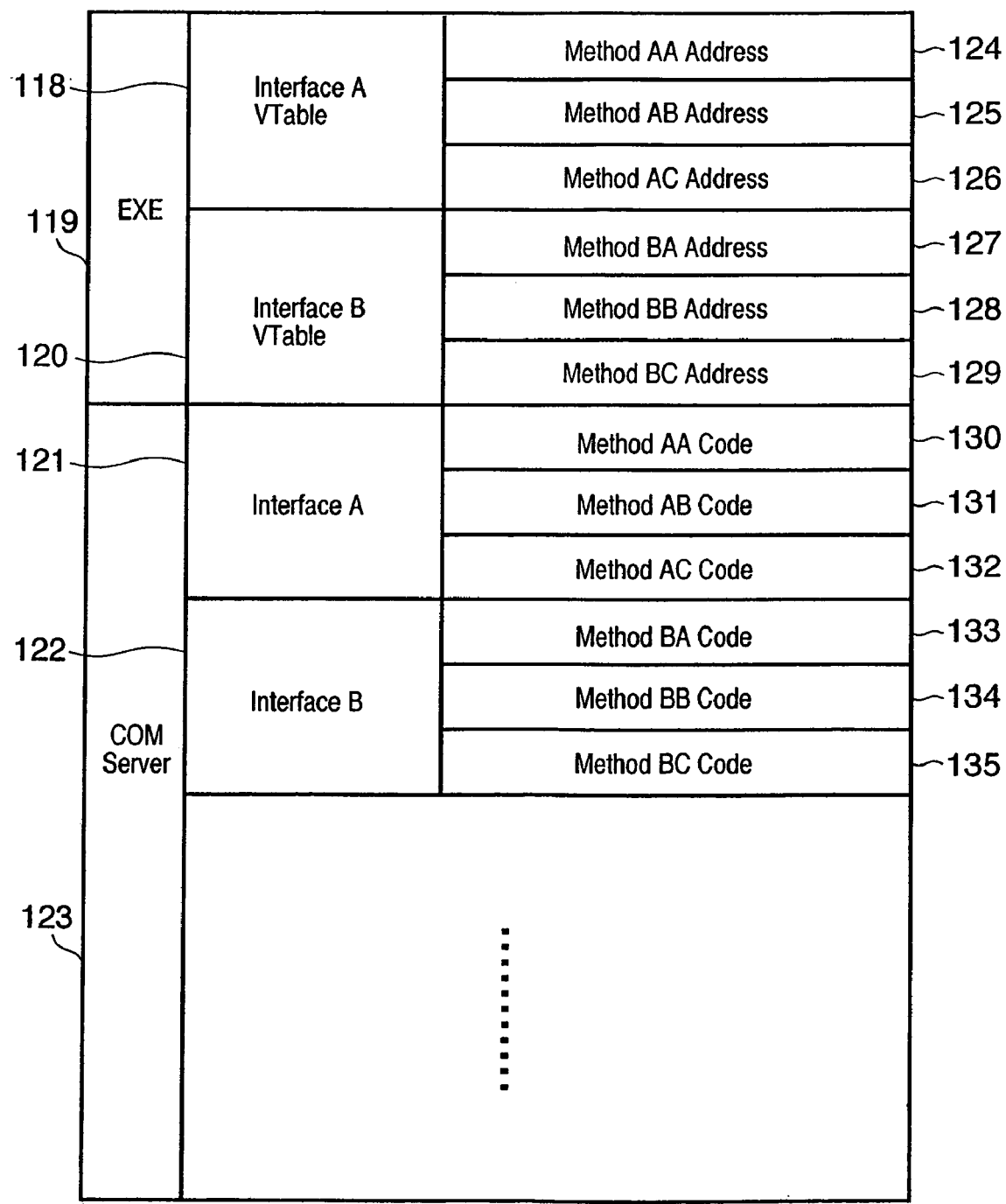
FIG. 6 is a view showing an example of a memory configuration when the executable file EXE creates an interface instance exported to a COM server in the information processing apparatus according to the embodiment of the present invention.

FIG. 6 is a view showing an example of a memory configuration when an executable file EXE (118) creates an interface instance exported to a COM (Component Object Model) server in the information processing apparatus according to the embodiment.

In general, when an interface instance is created, requested interfaces (121 and 122) and their methods (130 to 135) are created in the COM server, and loaded into the memory. Virtual address tables (118 and 120) are created for created interfaces, and passed to EXE which has requested the creation. The virtual address tables hold addresses (124 to 129) created for the respective methods. EXE utilizes these pieces of information, and calls the interfaces. In FIG. 6, one EXE creates two interface instances for Interface A and Interface B, and utilizes methods in the interfaces. Methods used actually are Method AA, Method AB, Method AC, Method BA, Method BB, and Method BC.

When the EXE code calls the function Method AA, a Method AA address (124) written in the virtual address table is read. The address (124) describes the address of a Method AA code (130) which is created as part of Interface A in the COM server. By calling the address, the EXE code can call Method AA of Interface A.

FIG. 7 is a view showing the memory configuration of the information processing apparatus according to the embodiment. This memory configuration is different from that in FIG. 6 in that a method call is mediated using VTable Patch (Virtual address Table Patch) as a log obtaining code.

After the start of obtaining a log, a VTable Patch DLL (143) is loaded into the memory. The DLL rewrites the addresses of methods written in virtual address tables (136 and 138) into those (145 to 150) of log obtaining codes Method A'A, Method A'B, Method A'C, Method B'A, Method B'B, and Method B'C in the DLL. The codes (157 to 162) of Method A'A, Method A'B, Method A'C, Method B'A, Method B'B, and Method B'C in the DLL record logs, and call Method AA, Method AB, Method AC, Method BA, Method BB, and Method BC (151 to 156) which have been loaded in the memory and wait for method calls.

Figure 8:
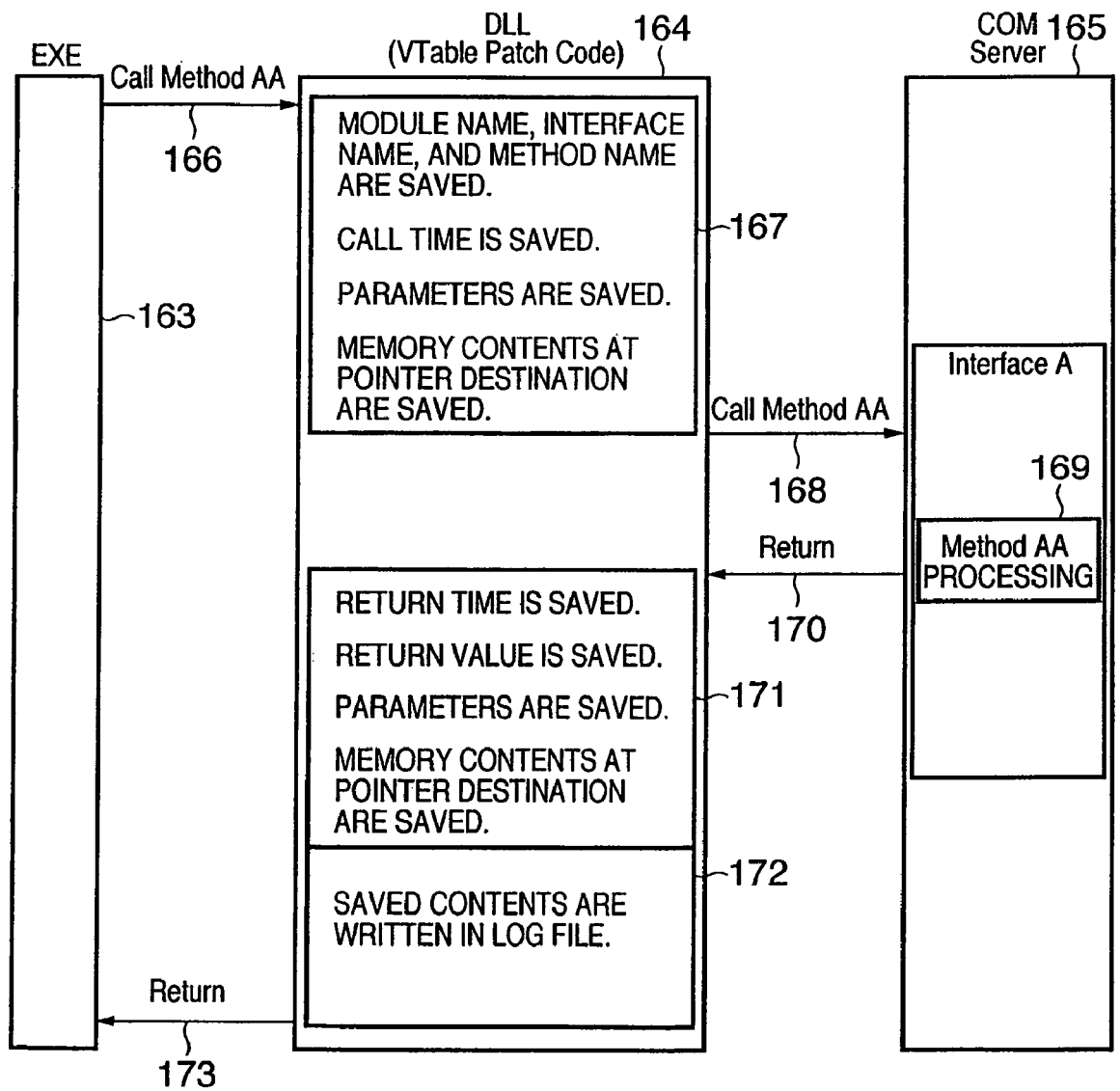
FIG. 8 is a timing chart showing an example when VTable Patch processing is executed in the information processing apparatus according to the embodiment of the present invention.

FIG. 8 is a timing chart showing VTable Patch processing in FIG. 7. For descriptive convenience, FIG. 8 shows an example of how the log obtaining code based on VTable Patch operates when EXE calls Method AA of Interface A in the COM server. The same processing is also performed for another function.

When EXE (163) calls Method AA (166), a log obtaining code in the DLL saves a module name, interface name, and method name in the memory, saves the call time in the memory, saves parameters upon the call in the memory, and saves memory contents represented by pointer parameters upon the call in the memory (167). Thereafter, the DLL calls Method AA in the COM server (165) that is supposed to be called (168). Method AA processing (169) in the COM server ends, and control returns to DLL (170). The DLL saves the return time in the memory, saves the return value in the memory, and saves memory contents represented by pointer parameters upon return in the memory (171). The DLL writes the saved log information in a file (172), and control returns to EXE as if Method AA in the COM server normally ended (173).

Figure 9:
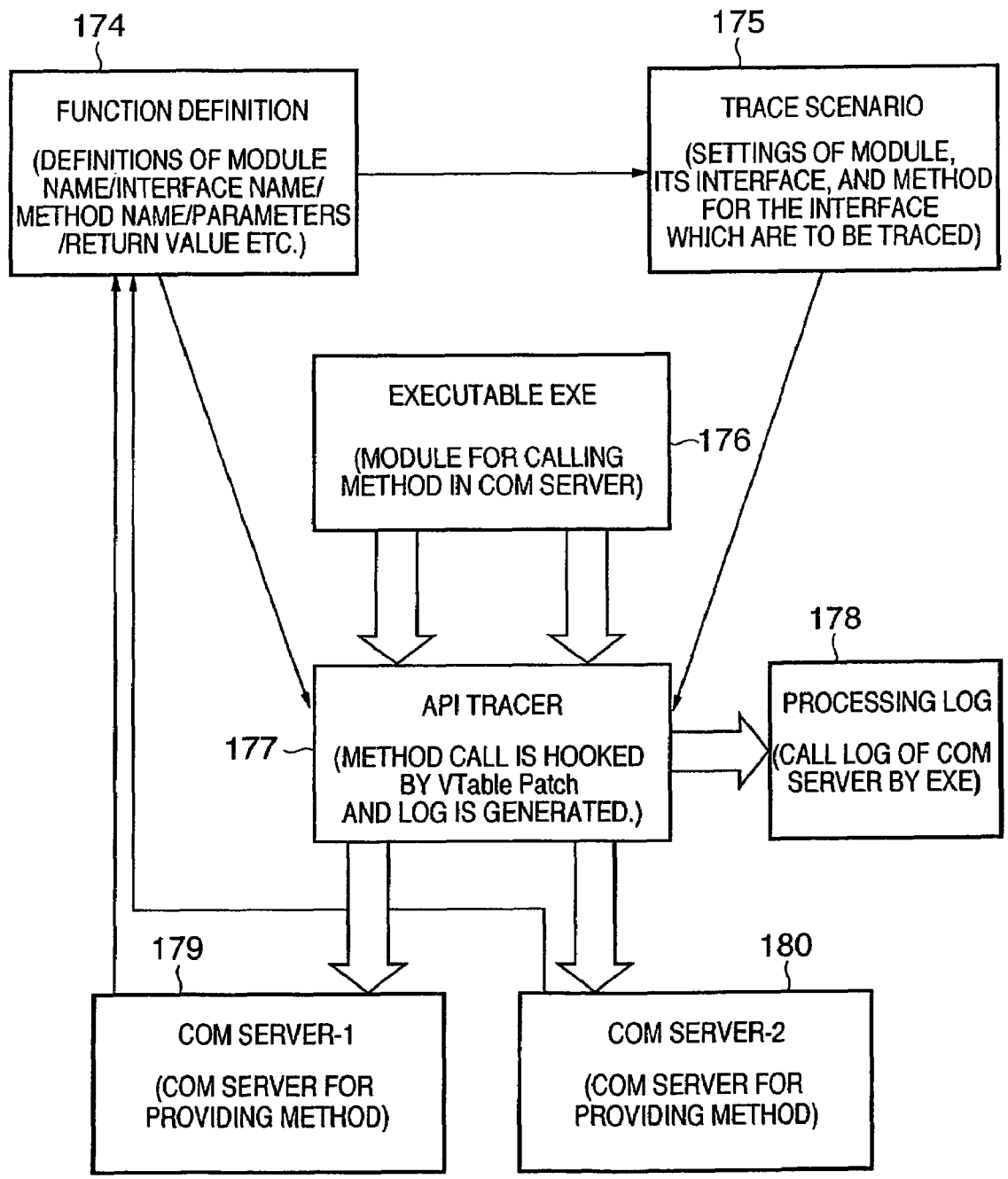
FIG. 9 is a view showing an example of operation when the executable file EXE is executed in the information processing apparatus according to the embodiment of the present invention.

FIG. 9 is a view showing an example of operation when the executable file EXE is executed in the information processing apparatus according to the embodiment. In general, an executable EXE (176) calls methods in COM server-1 (179) and COM server-2 (180). In FIG. 9, a log obtaining code called an API tracer is embedded (177) to generate a processing log (178). The API tracer operates on the basis of a file (174) which describes the function definitions of COM server-1 (179) and COM server-2, and a setup scenario (175) representing a COM server, an interface in the COM server, and a method for the interface for which a virtual address table is rewritten to obtain a log.

Figure 10:
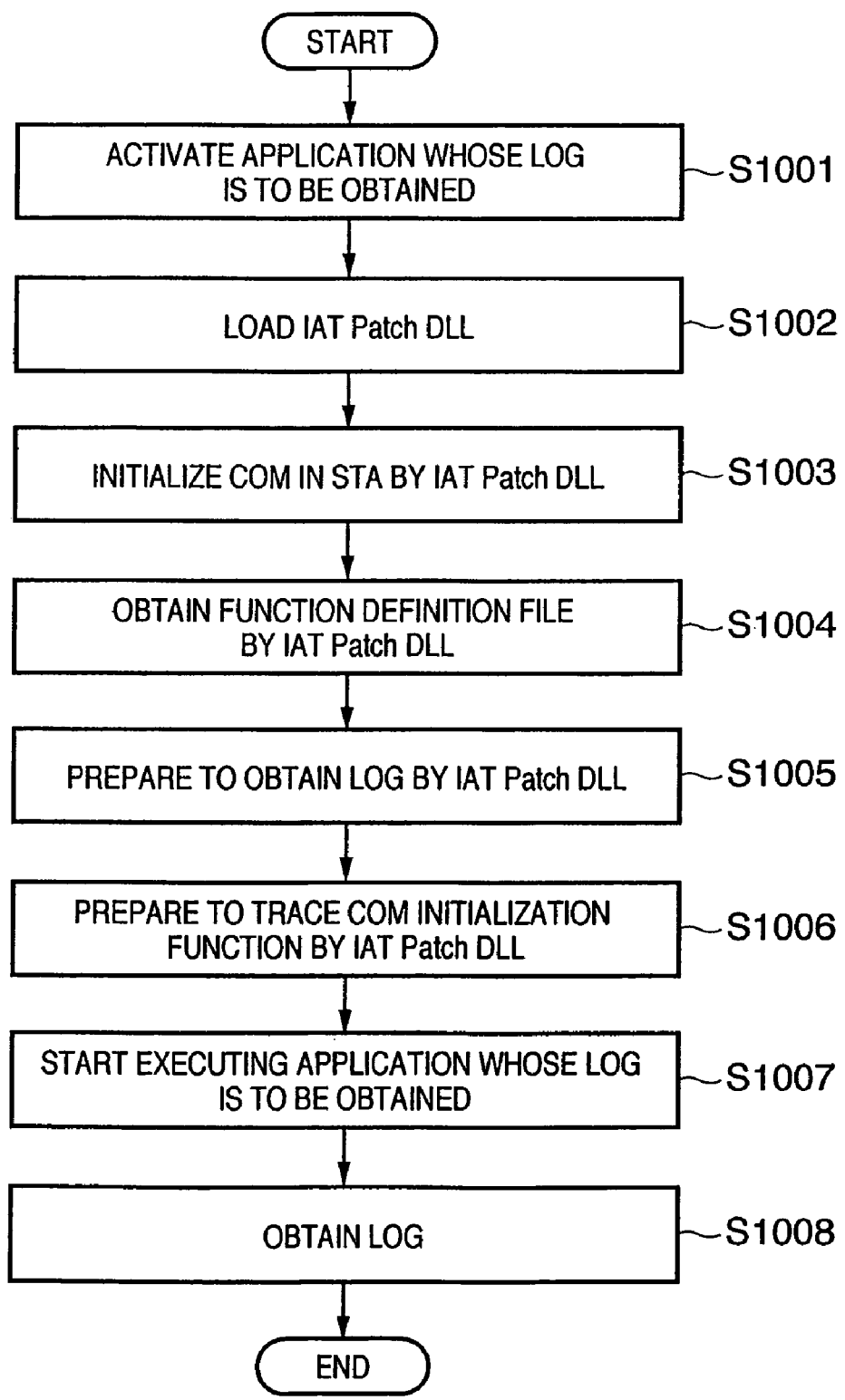
FIG. 10 is a flowchart showing an example of processing when an application whose log is to be obtained is activated and log obtaining processing starts in the information processing apparatus according to the embodiment of the present invention.

FIG. 10 is a flowchart showing an example of processing when an application whose log is to be obtained is activated and log obtaining processing starts in the information processing apparatus according to the embodiment.

A target application whose log is to be obtained is activated (S1001), and an IAT Patch DLL is loaded into the target application (S1002). The loaded DLL initializes the COM by STA (Single Thread Apartment) in the process of the target application (S1003). After initialization, the DLL reads Type Library as a function definition file by using a COM method (S1004), and performs log obtaining preparation processing in accordance with settings (S1005). The DLL prepares to obtain whether the target application has called a COM initialization function (S1006). The DLL executes the application whose log is to be obtained (S1007), and starts obtaining the log (S1008).

Figure 11:
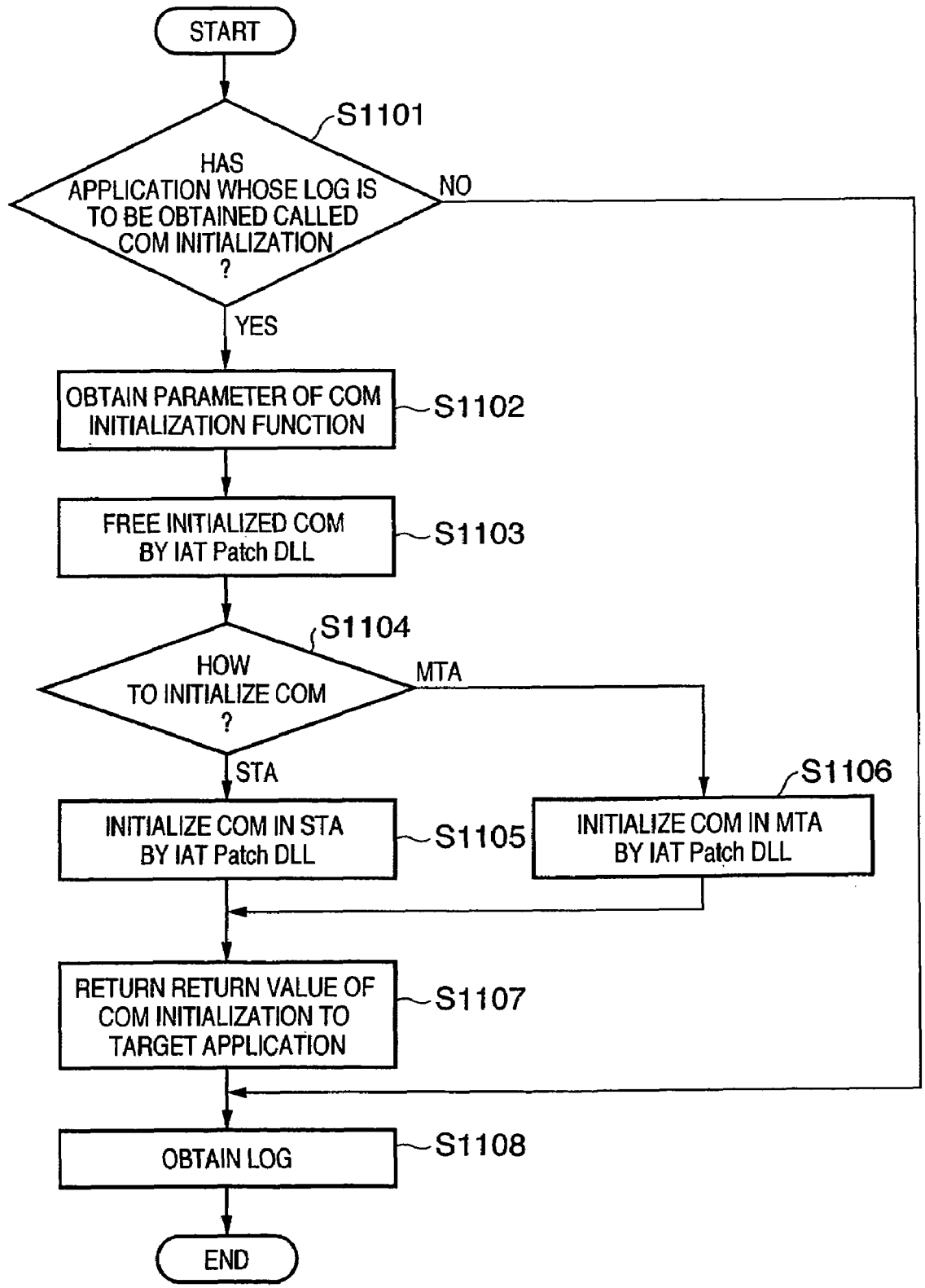
FIG. 11 is a flowchart showing an example of processing when the application whose log is to be obtained calls a COM initialization function in the information processing apparatus according to the embodiment of the present invention.

After the application whose log is to be obtained is activated to start obtaining the log, the target application executes initialization processing. FIG. 11 is a flowchart showing an example of processing when the application whose log is to be obtained calls a COM initialization function.

If the application whose log is to be obtained calls COM initialization processing (S1101), the processing shifts to the IAT Patch DLL to obtain the thread initialization parameter of the COM initialization function (S1102). The thread initialization parameter contains information representing which of STA (Single Thread Apartment) and MTA (Multi Thread Apartment) operation conditions is set to execute initialization processing in the target application.

The DLL frees the COM which has been initialized upon activation, and invalidates the COM initialization condition in the process (S1103). On the basis of the thread initialization parameter obtained in step S1102, the DLL determines which of the STA and MTA operation conditions is set to execute initialization processing in the target application (S1104). If it is determined that STA is set, the DLL initializes the COM by STA (S1105); if it is determined that MTA is set, initializes the COM by MTA (S1106). After the end of COM initialization, the DLL sets an end result in the called COM initialization function, returns the value to the application whose log is to be obtained (S1107), and continues obtaining the log (S1108).

As described above, the present invention adopts the log obtaining software. Regardless of whether software whose log is to be obtained performs COM initialization in STA or MTA, the log obtaining software automatically determines the COM initialization method to obtain the log without any influence of COM initialization by the target software.

OTHER EMBODIMENT

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-364781 filed on Dec. 16, 2004, which is hereby incorporated by reference herein.

What is claimed is:

1. An information processing apparatus which executes a first module, a second module, and a third module for mediating a call from the first module to a function in the second module and obtaining a log of processing in the second module, the third module comprising:
    a detector which detects a call from the first module to an initialization function associated with initialization processing in the second module;
    a determination unit which obtains an initialization parameter and determines an operation condition in which the initialization processing should be executed on the basis of the obtained initialization parameter, when the call to the initialization function is detected;
    an execution unit which executes the initialization processing in the determined operation condition; and
    a notifying unit which notifies the first module of an execution result of the initialization processing.

2. The apparatus according to claim 1, wherein the operation condition includes either of single thread apartment and multi-thread apartment.

3. An information processing method of executing a third module for mediating a call from a first module to a function in a second module and obtaining a log of processing in the second module, comprising:
    detecting a call from the first module to an initialization function associated with initialization processing in the second module;
    obtaining an initialization parameter;
    determining an operation condition in which the initialization processing should be executed on the basis of the obtained initialization parameter, when the call to the initialization function is detected;
    executing the initialization processing in the determined operation condition; and
    notifying the first module of an execution result of the initialization processing.

4. The method according to claim 3, wherein the operation condition includes either of single thread apartment and multi-thread apartment.

5. A computer program, stored in a computer-readable storage medium, for causing a computer to execute an information processing method of executing a third module for mediating a call from a first module to a function in a second module and obtaining a log of processing in the second module, the information processing method comprising:
    detecting a call from the first module to an initialization function associated with initialization processing in the second module;
    obtaining an initialization parameter;
    determining an operation condition in which the initialization processing should be executed on the basis of the obtained initialization parameter, when the call to the initialization function is detected;
    executing the initialization processing in the determined operation condition; and
    notifying the first module of an execution result of the initialization processing.

* * * * *